(12) United States Patent
Taira et al.

(10) Patent No.: US 11,095,244 B2
(45) Date of Patent: Aug. 17, 2021

(54) MOTOR DRIVE DEVICE AND MOTOR DRIVE SYSTEM

(71) Applicant: Mitsubishi Electric Corporation, Tokyo (JP)

(72) Inventors: Satoshi Taira, Tokyo (JP); Yoshitomo Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/959,439

(22) PCT Filed: Feb. 19, 2019

(86) PCT No.: PCT/JP2019/005963
§ 371 (c)(1),
(2) Date: Jul. 1, 2020

(87) PCT Pub. No.: WO2019/163729
PCT Pub. Date: Aug. 29, 2019

(65) Prior Publication Data
US 2020/0373868 A1 Nov. 26, 2020

(30) Foreign Application Priority Data

Feb. 23, 2018 (WO) .................. PCT/JP2018/006813

(51) Int. Cl.
*H02P 27/08* (2006.01)
*H02M 5/458* (2006.01)
(52) U.S. Cl.
CPC .......... *H02P 27/08* (2013.01); *H02M 5/4585* (2013.01)
(58) Field of Classification Search
USPC ....................................... 318/560
See application file for complete search history.

(56) References Cited

U.S. PATENT DOCUMENTS 8,004,220 B2 * 8/2011 Sparey .................. H02P 6/182
318/400.22
8,884,571 B2 11/2014 Okita et al.
(Continued)

FOREIGN PATENT DOCUMENTS

JP 2007-89323 A 4/2007
JP 2008-136258 A 6/2008
JP 2013-153607 A 8/2013

OTHER PUBLICATIONS

International Search Report and Written Opinion dated May 28, 2019 for PCT/JP2019/005963 filed on Feb. 19, 2019, 8 pages including English Translation of the International Search Report.

*Primary Examiner* — Bentsu Ro
(74) *Attorney, Agent, or Firm* — Xsensus LLP

(57) ABSTRACT

A motor drive device receiving AC power supplied from an AC source and driving a motor includes: a converter circuit converting the AC power into DC power; an inverter circuit converting the DC power into AC power to drive the motor; and a current detector detecting input current flowing on the AC side of the converter circuit. The motor drive device also includes a converter device and an inverter device. The converter device includes a control unit performing control such that input current or input power supplied to the converter circuit does not exceed an upper limit, based on a value detected by the current detector. The inverter device includes a control unit detecting voltage of a DC bus connecting the converter circuit and the inverter circuit, and limiting the output power of the inverter circuit when a detection value of the bus voltage decreases to a set lower limit.

13 Claims, 15 Drawing Sheets

(56) References Cited

U.S. PATENT DOCUMENTS

| | | | |
|---|---|---|---|
| 2005/0077853 A1* | 4/2005 | Nagakura | H02M 7/48 |
| | | | 318/432 |
| 2006/0055349 A1* | 3/2006 | Nakayama | H02M 3/1582 |
| | | | 318/400.18 |
| 2011/0031916 A1* | 2/2011 | Bonner | H02P 23/0077 |
| | | | 318/400.26 |
| 2011/0260667 A1* | 10/2011 | Ramamurthy | H02P 5/68 |
| | | | 318/434 |

* cited by examiner

MOTOR DRIVE DEVICE AND MOTOR DRIVE SYSTEM

CROSS-REFERENCE TO RELATED APPLICATIONS

The present application is based on PCT filing PCT/JP2019/005963, filed Feb. 19, 2019, which claims priority to PCT filing PCT/JP2018/006813, filed Feb. 23, 2018, the entire contents of each are incorporated herein by reference.

FIELD

The present invention relates to a motor drive device that receives AC power supplied from an AC source and drives a motor as a load, and a motor drive system.

BACKGROUND

In a motor drive device, the capacities of a converter device and peripheral devices to be disposed at a stage preceding an inverter device that drives a motor are selected in consideration of the maximum load of a motor drive system including the motor drive device.

However, in an actual operating environment, the load of the motor drive system reaches the maximum load only during a specific brief operation period. Therefore, in the motor drive system, selecting peripheral devices in consideration of the maximum load has been a factor that increases the scale of the system and increases the cost of system construction.

To address the above problem, Patent Literature 1 below discloses the following technique.

(1) When input current or input power supplied from an AC source to a converter device is out of a predetermined range, information to that effect is transmitted to an inverter device at a subsequent stage by a communication means.

(2) The inverter device that has received the information to the effect that the input current or the input power is out of the predetermined range limits torque or rotation speed for driving a motor, and reduces AC power to be supplied from the inverter device to the motor. This prevents an excessive input current exceeding an allowable value from flowing on the AC side of the converter device.

CITATION LIST

Patent Literature

Patent Literature 1: Japanese Patent Application Laid-open No. 2013-153607

SUMMARY

Technical Problem

As described above, in the technique of Patent Literature 1, both the converter device and the inverter device need to include communication means. Therefore, when the technique of Patent Literature 1 is adopted, dedicated communication means are required. In addition, certain man-hours are required so as to lay communication circuits and communication lines to be included in the communication means. This causes a problem of a longer system construction period and a higher system construction cost.

Furthermore, in the case of a configuration with a dedicated communication means, there is also a concern that malfunction of an apparatus may be caused by the influence of noise at the time of communication and an inflow of noise current through the communication line.

Additionally, in the case of a system including a communication means, delay time in transmitting detection information of a converter device to an inverter device may be a problem. For example, when an analog value is transmitted so as to perform fine control in the communication between the converter device and the inverter device, a redundant bit is often added as a measure against noise. In the case of such a system, the amount of information to be transmitted increases, and thus, the system is significantly affected by delay time. For this reason, there is a possibility that the apparatus may be damaged due to generation of an unexpectedly large input current or input power on the input side, that is, the AC side of the converter device, caused by a delay in the control of torque limitation or rotation speed limitation on a motor.

The present invention has been made in view of the above, and it is an object of the present invention to obtain a motor drive device and a motor drive system, the motor drive device being capable of preventing generation of an unexpectedly large input current or input power on the AC side of a converter device without providing a communication means in the converter device or an inverter device.

Solution to Problem

In order to solve the problems and achieve the object described above, an aspect of the present invention is a motor drive device that receives AC power supplied from an AC source and drives a motor. The motor drive device includes: a converter circuit to convert the AC power into DC power; and an inverter circuit to drive the motor by converting the DC power supplied from the converter circuit into AC power and supplying the AC power to the motor. The motor drive device further includes a converter control unit to perform control such that an input current flowing on an AC side of the converter circuit or input power supplied to the converter circuit does not exceed an upper limit. The motor drive device further includes an inverter control unit to detect a bus voltage that is a voltage of a DC bus connecting the converter circuit and the inverter circuit, and to limit output power of the inverter circuit when a detection value of the bus voltage decreases to a set lower limit.

Advantageous Effects of Invention

The present invention can achieve an effect of preventing generation of an unexpectedly large input current or input power on the AC side of a converter device without providing a communication means in the converter device or an inverter device.

DESCRIPTION OF EMBODIMENTS

Figure 1:
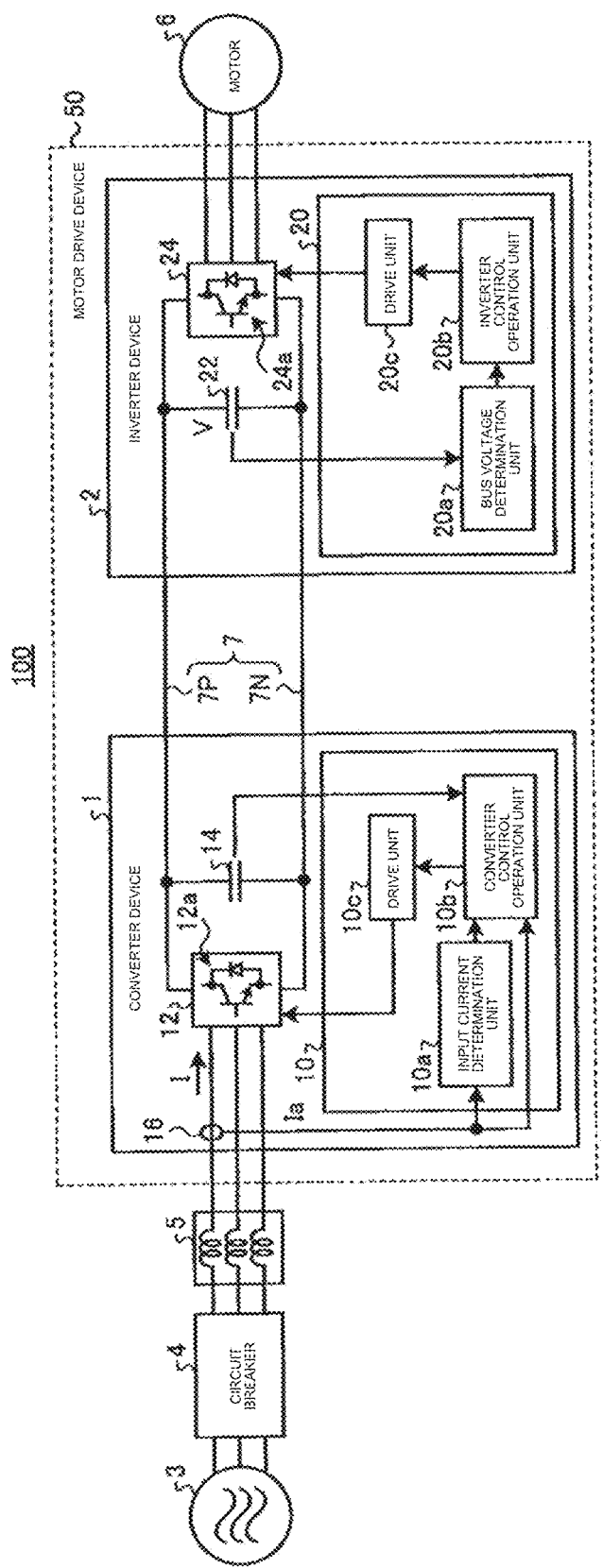
FIG. 1 is a configuration diagram of a motor drive system including a motor drive device according to a first embodiment.

Hereinafter, motor drive devices according to embodiments of the present invention will be described in detail with reference to the accompanying drawings. Note that the present invention is not limited to the following embodiments. Furthermore, a motor is exemplified by a three-phase motor in the following description. However, a motor other than the three-phase motor may also be used. In addition, a power source is exemplified by a three-phase AC source. However, an AC source other than the three-phase AC source may also be used. Moreover, semiconductor elements described in the drawings are merely examples, and semiconductor switching elements with other symbols may also be used. Furthermore, in the following description, physical connection and electrical connection are simply referred to as "connection" without being distinguished from each other.

First Embodiment

FIG. 1 is a configuration diagram of a motor drive system 100 including a motor drive device 50 according to a first embodiment. As illustrated in FIG. 1, the motor drive system 100 according to the first embodiment includes a circuit breaker 4, a reactor 5, the motor drive device 50, and a motor 6. Furthermore, the motor drive device 50 includes a converter device 1 and an inverter device 2. The converter device 1 is supplied with AC power from an AC source 3. The inverter device 2 is supplied with DC power from the converter device 1. As an example of the converter device 1, FIG. 1 illustrates a three-phase pulse width modulation (hereinafter referred to as "PWM") converter capable of controlling current on an AC side.

Note that the case of using a PWM converter as an example of the converter device 1 will be described in the present embodiment. However, a converter to be used need not be limited to a PWM converter as long as the converter can control current on the AC side.

In FIG. 1, the AC source 3 is a power supply source that supplies AC power to the converter device 1. The circuit breaker 4 and the reactor 5 are disposed between the AC source 3 and the converter device 1. The reactor 5 is a device including a circuit element that temporarily stores electrical energy. The circuit breaker 4 is a device that is disposed on an electric wire that connects the AC source 3 and the converter device 1, and can cut off a current flowing between the AC source 3 and the converter device 1. A molded case circuit breaker (MCCB) is an example of the circuit breaker 4. The motor 6 is a target to be driven by the motor drive device 50. When a load (not illustrated) is a machine tool, the motor 6 is a servomotor and a spindle motor.

Note that although the circuit breaker 4 and the reactor 5 are illustrated as peripheral devices in the present embodiment, the circuit breaker 4 need not be provided. Alternatively, a peripheral device other than the circuit breaker 4 and the reactor 5 may be provided.

The converter device 1 includes a control unit 10, a converter circuit 12, and a smoothing capacitor 14. A current detector 16 is disposed between the converter circuit 12 and the reactor 5.

In FIG. 1, the current detector 16 is provided only for a single phase, but may be provided for all the three phases. As a result of detecting three-phase currents, an average value can be used when an imbalance occurs in the detection value of current. This is advantageous in that robustness is high at the time of voltage imbalance.

The converter circuit 12 includes a plurality of switching elements 12a. The switching elements 12a each include a transistor device and a diode connected in an anti-parallel manner. Note that the arrangement and connection of the switching elements 12a in the converter circuit 12 are publicly known, and description thereof will be omitted here.

The inverter device 2 includes a control unit 20, a smoothing capacitor 22, and an inverter circuit 24.

The inverter circuit 24 includes a plurality of switching elements 24a. The switching elements 24a each include a transistor device and a diode connected in an anti-parallel manner. Note that the arrangement and connection of the switching elements 24a in the inverter circuit 24 are publicly known, and description thereof will be omitted here.

The converter circuit 12 and the inverter circuit 24 are connected by use of a DC bus 7. The DC bus 7 is an electric wire connecting the converter circuit 12 and the inverter circuit 24. The DC bus 7 includes a high-potential-side conductor 7P and a low-potential-side conductor 7N. A side of the converter circuit 12 on which the converter circuit 12 is connected to the DC bus 7 is referred to as a DC side, and a side of the converter circuit 12 on which the converter circuit 12 is connected to the AC source 3 is referred to as an AC side. In addition, a side of the inverter circuit 24 on which the inverter circuit 24 is connected to the DC bus 7 is referred to as a DC side, and a side of the inverter circuit 24 on which the inverter circuit 24 is connected to the motor 6 is referred to as an AC side.

The converter circuit 12 receives AC power supplied from the AC source 3 via the circuit breaker 4 and the reactor 5.

The converter circuit 12 converts the received AC power into DC power, and supplies the DC power to the inverter circuit 24. The inverter circuit 24 drives the motor 6 by converting the DC power supplied from the converter circuit 12 into AC power with any desired magnitude and frequency and supplying the AC power to the motor 6.

The smoothing capacitor 14 is connected in parallel to both ends of the converter circuit 12 at a stage subsequent to the converter circuit 12. One end of the smoothing capacitor 14 is connected to the high-potential-side conductor 7P of the DC bus 7, and the other end of the smoothing capacitor 14 is connected to the low-potential-side conductor 7N of the DC bus 7. The DC power converted by the converter circuit 12 is stored in the smoothing capacitor 14.

The smoothing capacitor 22 is connected in parallel to both ends of the inverter circuit 24 at a stage preceding the inverter circuit 24. One end of the smoothing capacitor 22 is connected to the high-potential-side conductor 7P of the DC bus 7, and the other end of the smoothing capacitor 22 is connected to the low-potential-side conductor 7N of the DC bus 7.

As described above, both the smoothing capacitor 14 and the smoothing capacitor 22 are connected to the high-potential-side conductor 7P of the DC bus 7 and the low-potential-side conductor 7N of the DC bus 7 while being located between the high-potential-side conductor 7P and the low-potential-side conductor 7N. Therefore, the one end of the smoothing capacitor 14 and the one end of the smoothing capacitor 22 are at the same potential, and the other end of the smoothing capacitor 14 and the other end of the smoothing capacitor 22 are at the same potential. That is, the smoothing capacitor 14 and the smoothing capacitor 22 are connected in parallel with each other. Furthermore, the DC power converted by converter circuit 12 is also stored in the smoothing capacitor 22. Note that a configuration including the smoothing capacitors 14 and 22 is described in the present embodiment. However, at least one of the smoothing capacitors 14 and 22 just needs to be provided.

Next, the function of the control unit 10 will be described. The control unit 10 includes an input current determination unit 10a, a converter control operation unit 10b, and a drive unit 10c. The current detector 16 detects an input current I that is a current flowing between the reactor 5 and the converter circuit 12. A detection value Ia detected by the current detector 16 is input to the input current determination unit 10a and the converter control operation unit 10b.

The input current determination unit 10a determines whether the detection value Ia detected by the current detector 16 does not exceed a current upper limit. The input current determination unit 10a transmits a signal corresponding to a result of the determination to the converter control operation unit 10b.

The converter control operation unit 10b generates a PWM signal for performing PWM control on the converter circuit 12. When generating the PWM signal, the converter control operation unit 10b adjusts the pulse width of the PWM signal such that the input current I does not exceed the current upper limit. That is, the converter control operation unit 10b performs control such that the input current I does not exceed the upper limit, by using the signal transmitted from the input current determination unit 10a in addition to a signal to be used in the conventional converter control.

As described above, the input current I is controlled by the functions of the input current determination unit 10a and the converter control operation unit 10b so as not to exceed the current upper limit. The current upper limit is set in the control unit 10. The current upper limit may be dynamically input from the outside.

Furthermore, a power upper limit may be used instead of the current upper limit. The power upper limit may be held internally or may be input from outside. Note that generally, the output voltage of the AC source 3 for operating the motor drive system 100 is predetermined. Therefore, input power to be supplied to the converter device 1 can be calculated based on the detection value Ia detected by the current detector 16. In addition, a voltage detection unit that detects the output voltage of the AC source 3 or the input voltage of the converter device 1 may be provided so as to perform accurate control. In the case of adopting such a configuration, power input to the converter device 1 is dynamically obtained based on a detection value detected by the voltage detection unit and the detection value Ia detected by the current detector 16.

The drive unit 10c generates a drive signal for driving the switching elements 12a of the converter circuit 12, by using the PWM signal generated by the converter control operation unit 10b. The magnitude of the input current I is adjusted by PWM control of the switching elements 12a of the converter circuit 12 with the PWM signal.

Next, the function of the control unit 20 will be described. The control unit 20 includes a bus voltage determination unit 20a, an inverter control operation unit 20b, and a drive unit 20c.

The bus voltage determination unit 20a compares a bus voltage V, which is the voltage of the DC bus 7, with a predetermined value. The bus voltage V is an output voltage of the converter device 1 and an input voltage of the inverter device 2. Furthermore, in the case of the circuit configuration illustrated in FIG. 1, the bus voltage V is equal to each voltage of the smoothing capacitor 14 and the smoothing capacitor 22. The result of determination of the bus voltage determination unit 20a is input to the inverter control operation unit 20b.

The inverter control operation unit 20b generates a PWM signal for performing PWM control on the inverter circuit 24. When generating the PWM signal, the inverter control operation unit 20b adjusts the pulse width of the PWM signal such that the output torque of the motor 6 matches a torque command. Alternatively, when generating the PWM signal, the inverter control operation unit 20b adjusts the pulse width of the PWM signal such that the rotation speed of the motor 6 matches a rotation speed command.

In addition to the above function, the inverter control operation unit 20b according to the first embodiment also has the function of controlling power to be output to the motor 6 on the basis of the determination result of the bus voltage V. Specifically, a lower limit of the bus voltage V is set in the bus voltage determination unit 20a. The lower limit may be dynamically input from the outside. The bus voltage determination unit 20a detects a decrease in the bus voltage V on the basis of the bus voltage V and a predetermined lower limit. When the bus voltage determination unit 20a determines that the bus voltage has decreased to the predetermined lower limit, the inverter control operation unit 20b limits the power to be output to the motor 6. At this time, the inverter control operation unit 20b operates as a limiting unit that limits the output power of the inverter circuit 24. It is possible to limit output power by controlling the torque command or the rotation speed command in a lowering direction. When generating the PWM signal, the inverter control operation unit 20b adjusts the pulse width of the PWM signal such that the bus voltage V does not fall below the lower limit.

The drive unit 20c generates a drive signal for driving the switching elements 24a of the inverter circuit 24 by using the PWM signal generated by the inverter control operation unit 20b. The magnitude of the output power is adjusted by PWM control of the switching elements 24a of the inverter circuit 24. Note that the output power of the inverter circuit 24 is output, as the output power of the inverter device 2, to the motor 6.

Note that when the control unit 10 of the converter device 1 and the control unit 20 of the inverter device 2 are represented without reference signs, the control unit 10 is referred to as a "converter control unit", and the control unit 20 is referred to as an "inverter control unit".

Figure 2:
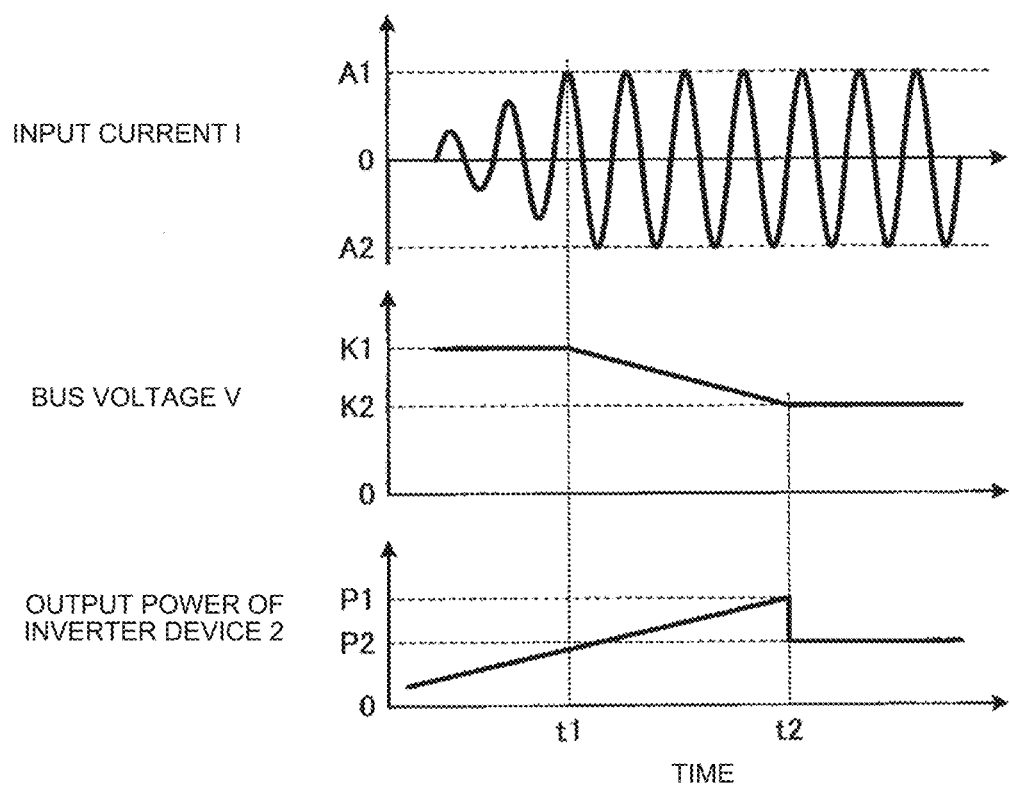
FIG. 2 is a diagram for describing the operation of the motor drive device according to the first embodiment.

Next, the operation of the motor drive device 50 according to the first embodiment will be described with reference to FIGS. 1 and 2. FIG. 2 is a diagram for describing the operation of the motor drive device 50 according to the first embodiment.

A time-varying waveform of the input current I is illustrated in the upper part of FIG. 2. A time-varying waveform of the bus voltage V is illustrated in the middle part of FIG. 2. A time-varying waveform of the output power of the inverter device 2 is illustrated in the lower part of FIG. 2.

As described above, in the converter device 1 according to the first embodiment, the input current I is controlled so as not to exceed the current upper limit. In FIG. 2, time t1 indicates the time when this control is started. At the time t1, the waveform of the input current I has a peak-side amplitude controlled so as not to exceed A1 and a bottom-side amplitude controlled so as not to fall below A2 as illustrated in the drawing. If the waveform is symmetric with respect to zero, the following holds: A2=−A1.

When a limitation is imposed on the input current I, the bus voltage V decreases from K1, which is a value corresponding to the time t1, as illustrated in the drawing. While the bus voltage V decreases, the output power of the inverter device 2 increases. The reason why the bus voltage V decreases is that the output power of the inverter device 2 increases even though a limitation is imposed on the input current I. The output power of the inverter device 2 is equivalent to power to be consumed by the motor 6. That is, the power consumption of the motor 6 exceeds power supplied from the converter device 1. Therefore, the bus voltage V decreases.

At time t2, at which the value of the bus voltage V decreases to K2, a limitation is imposed on the output power of the inverter device 2. As described above, it is possible to limit the output power of the inverter device 2 by controlling the torque command or the rotation speed command in a lowering direction. FIG. 2 illustrates an example in which, at the time t2, the output power of the inverter device 2 reaches P1 and is reduced to P2 by the limitation on the output power. With this control, the decrease in the bus voltage V is stopped. Therefore, the minimum bus voltage required for the system can be maintained, so that the decrease in the bus voltage V does not cause the system to stop. Thus, the operation of the system is continued.

Note that although FIG. 2 illustrates an example in which the torque command or the rotation speed command is switched in a stepwise manner with the bus voltage V having decreased to the lower limit K2 as a trigger, the present invention is not limited to this example. A Proportional Integral Differential (PID) control system may be configured in the inverter control operation unit 20b such that the torque command or the rotation speed command is continuously changed according to the value of a difference between a detection value Vd of the bus voltage V and the lower limit K2. Note that the system can be configured relatively easily in the case where the command is switched in a stepwise manner. Furthermore, in the case where the command is continuously changed, the torque or the number of rotations can be smoothly changed.

Figure 3:
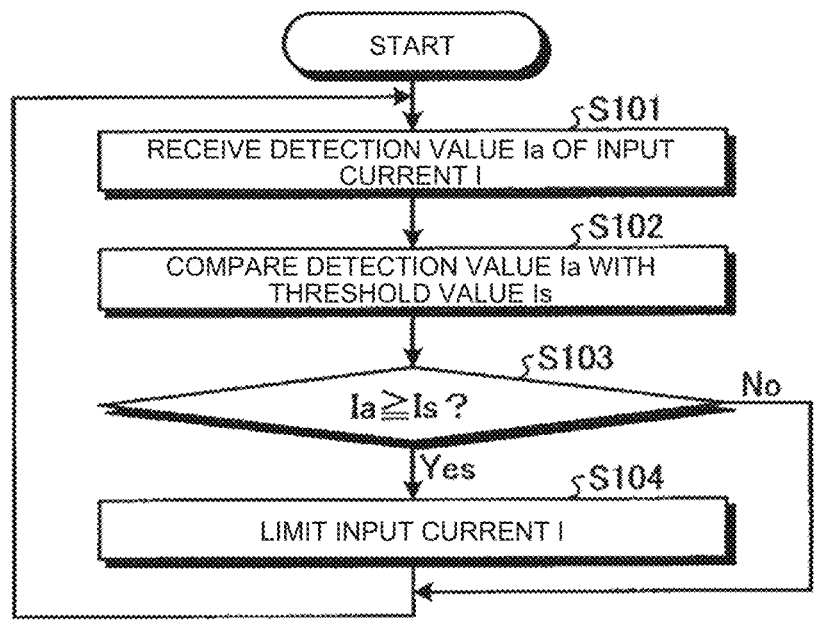
FIG. 3 is a flowchart illustrating an operation flow in a converter device according to the first embodiment.
Figure 4:
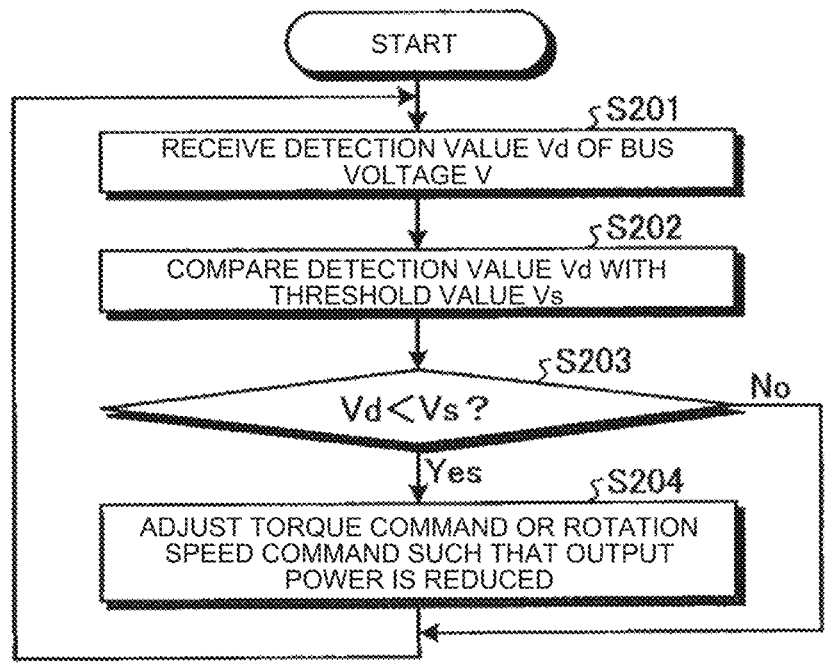
FIG. 4 is a flowchart illustrating an operation flow in an inverter device according to the first embodiment.

FIG. 3 is a flowchart illustrating an operation flow in the converter device 1 according to the first embodiment. FIG. 4 is a flowchart illustrating an operation flow in the inverter device 2 according to the first embodiment.

First, in FIG. 3, the input current determination unit 10a receives the detection value Ia of the input current I detected by the current detector 16 (step S101), and compares the detection value Ia with a threshold value Is (step S102). The threshold value Is corresponds to the value of A1 or A2 illustrated in FIG. 2, that is, a current upper limit of the input current I.

When the detection value Ia is equal to or larger than the threshold value Is (step S103, Yes), the input current determination unit 10a transmits an input current limit signal to the converter control operation unit 10b, and the converter control operation unit 10b limits input current by using the input current limit signal (step S104). At this time, the input current determination unit 10a generates a PWM signal on the basis of the input current limit signal in such a way as to limit the input current. After the processing of step S104 ends, the process returns to step S101, and the above-described processing is repeated.

Meanwhile, when the detection value Ia is lower than the threshold value Is (step S103, No), the converter control operation unit 10b skips the processing of step S104, and generates a PWM signal. Then, the process returns to step S101. Thereafter, the above-described processing is repeated.

Note that when the detection value Ia is equal to the threshold value Is, a determination of "Yes" is made in the above-described determination processing in step S103, and the process proceeds to step S104. However, a determination of "No" may be made to cause the process to return to step S101. That is, either determination of "Yes" or "No" may be made when the detection value Ia is equal to the threshold value Is.

Furthermore, in FIG. 4, the bus voltage determination unit 20a receives the detection value Vd of the bus voltage V (step S201). Note that the bus voltage determination unit 20a may detect the bus voltage. The bus voltage determination unit 20a compares the detection value Vd with a threshold value Vs (step S202). The threshold value Vs corresponds to the lower limit K2 of the bus voltage V illustrated in FIG. 2.

The bus voltage determination unit 20a transmits, as an output signal, a result of determination as to whether the detection value Vd is lower than the threshold value Vs to the inverter control operation unit 20b. When the detection value Vd is lower than the threshold value Vs (step S203, Yes), the bus voltage determination unit 20a outputs, to the inverter control operation unit 20b, a torque command or an output power limit signal for limiting the number of rotations. In response to the result of determination of the bus voltage determination unit 20a, the inverter control operation unit 20b performs the above-described process of limiting the output power of the inverter device 2 (step S204). Specifically, a PWM signal is generated in such a way as to limit the output power. After the processing of step S204 ends, the process returns to step S201, and the above-described processing is repeated.

Meanwhile, when the detection value Vd is equal to or larger than the threshold value Vs (step S203, No), the inverter control operation unit 20b skips the processing of step S204, and returns to step S201. Thereafter, the above-described processing is repeated.

Note that when the detection value Vd is equal to the threshold value Vs, a determination of "No" is made in the above-described determination processing in step S203, and the process returns to step S201. However, a determination of "Yes" may be made to cause the process to proceed to step S204. That is, either determination of "Yes" or "No" may be made when the detection value Vd is equal to the threshold value Vs.

As described above, the converter device 1 in the first embodiment has the function of performing control based on the detection value Ia of the input current I such that the input current I or input power does not to exceed the upper limit. Furthermore, the inverter device 2 in the first embodiment has the function of detecting a decrease in the bus voltage V due to a limitation on the input current I or input power, and limiting power to be output to the motor 6. Therefore, in the motor drive device 50 according to the first embodiment, it is possible to maintain the input current I or input power at a set limit value or below, that is, reduce the peak value of the input current or input power while the system continues to operate.

Accordingly, it is possible to prevent generation of the unexpectedly large input current I or input power on the AC side of the converter device 1 without providing a communication means in the converter device 1 or the inverter device 2. As a result, it is possible to avoid causing the load of the motor drive system 100 to be a maximum load described in the section "Background". That is, unlike the conventional technique, it is possible to avoid causing the load to excessively increase only during a specific brief operation period. Accordingly, unlike the conventional technique, the inverter device 2, the converter device 1 disposed at a stage preceding the inverter device 2, and the peripheral devices such as the circuit breaker 4 and the reactor 5 need not be selected in consideration of the maximum load of the motor drive system 100. In addition, there is no need to lay communication circuits or communication lines. Thus, it is possible to prevent an increase in system scale and an increase in system construction costs. Furthermore, no communication means is used. Thus, there is no concern about malfunction or communication errors due to noise. In addition, since there is no delay resulting from communication, high-speed control can be achieved.

Note that when converter control and inverter control are performed in the conventional manner, the control is generally performed by use of detection signals concerning the input current and the bus voltage so as to increase protection or control accuracy. According to the motor drive device according to the present embodiment, the above-described effect can be obtained by use of a detection signal already used.

Figure 5:
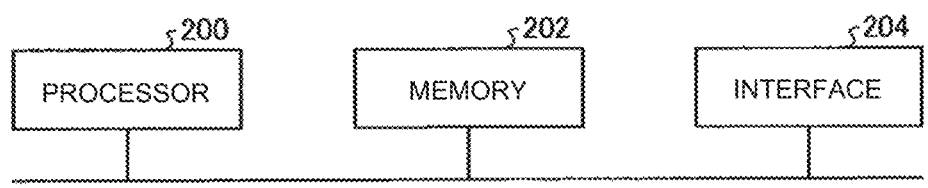
FIG. 5 is a block diagram illustrating an example of a hardware configuration for implementing, with software, the function of each operation unit of a converter control unit and an inverter control unit in the first embodiment.
Figure 6:
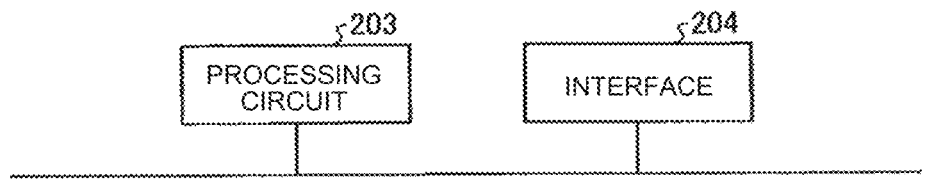
FIG. 6 is a block diagram illustrating another example of the hardware configuration for implementing, with software, the function of each operation unit of the converter control unit and the inverter control unit in the first embodiment.

Next, a hardware configuration for implementing, with software, the functions of the converter control operation unit 10b and the inverter control operation unit 20b in the first embodiment will be described with reference to FIGS. 5 and 6. FIG. 5 is a block diagram illustrating an example of a hardware configuration for implementing, with software, the functions of the converter control operation unit 10b and the inverter control operation unit 20b in the first embodiment. FIG. 6 is a block diagram illustrating another example of the hardware configuration for implementing, with software, the functions of the converter control operation unit 10b and the inverter control operation unit 20b in the first embodiment.

In the case where the functions of the converter control operation unit 10b and the inverter control operation unit 20b in the first embodiment are implemented by software, it is possible to adopt a configuration that includes a processor 200, a memory 202, and an interface 204, as illustrated in FIG. 5. The processor 200 performs operations. The memory 202 stores a program to be read by the processor 200. The interface 204 inputs/outputs signals.

The processor 200 may be an arithmetic means such as an arithmetic unit, a microprocessor, a microcomputer, a central processing unit (CPU), or a digital signal processor (DSP). Furthermore, examples of the memory 202 include a non-volatile or volatile semiconductor memory such as a random access memory (RAM), a read only memory (ROM), a flash memory, an erasable programmable ROM (EPROM), or an electrically EPROM (EEPROM) (registered trademark), a magnetic disk, a flexible disk, an optical disk, a compact disc, a mini disc, a digital versatile disc (DVD), and a Blu-ray Disc (BD) (registered trademark).

The memory 202 stores a program for executing the functions of the converter control operation unit 10b and the inverter control operation unit 20b, and a table to be referred to by the processor 200. The processor 200 transmits and receives necessary information via the interface 204, executes the program stored in the memory 202, and refers to the table stored in the memory 202. Thus, the processor 200 can perform arithmetic processing of the converter control operation unit 10b and the inverter control operation unit 20b. The result of the arithmetic processing performed by the processor 200 can be output to other functional units via the interface 204.

The processor 200 and the memory 202 illustrated in FIG. 5 may be replaced by a processing circuit 203 as illustrated in FIG. 6. The processing circuit 203 corresponds to a single circuit, a composite circuit, an application specific integrated circuit (ASIC), a field-programmable gate array (FPGA), or a combination thereof. Note that some of the processes to be performed in the converter control operation unit 10b and the inverter control operation unit 20b may be performed by the processing circuit 203, and processes not performed by the processing circuit 203 may be performed by the processor 200 and the memory 202.

Figure 7:
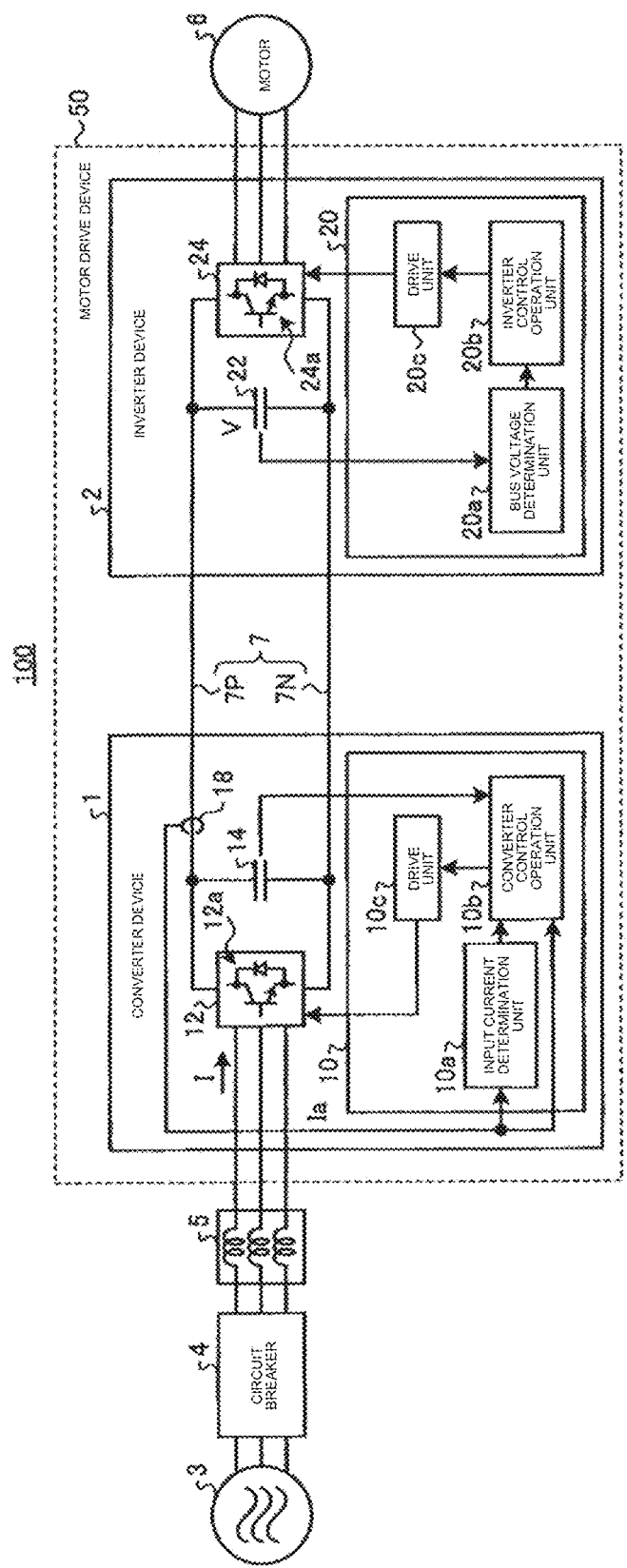
FIG. 7 is a configuration diagram of a motor drive system according to a modification of the first embodiment.

FIG. 7 is a configuration diagram of a motor drive system according to a modification of the first embodiment. In the first embodiment, the current detector 16 is provided on the AC side of the converter device 1. However, a current detector 18 that detects the current of the DC bus 7 may be provided on the DC side of the converter device 1, as illustrated in FIG. 7. For example, assume a case where the current detector 18 is provided at the DC-side positive terminal of the converter device 1 to detect the output current of the converter circuit 12. The relation between the input power and the output power of the converter circuit 12 is equal. Accordingly, if the output current of the converter circuit 12 is detected, current input to the converter circuit 12 can be calculated. Therefore, even when the current detector 18 is provided on the DC side of the converter device 1, it is possible to apply the method of the first embodiment in which control is performed based on the input current I to the converter circuit 12.

Second Embodiment

Figure 8:
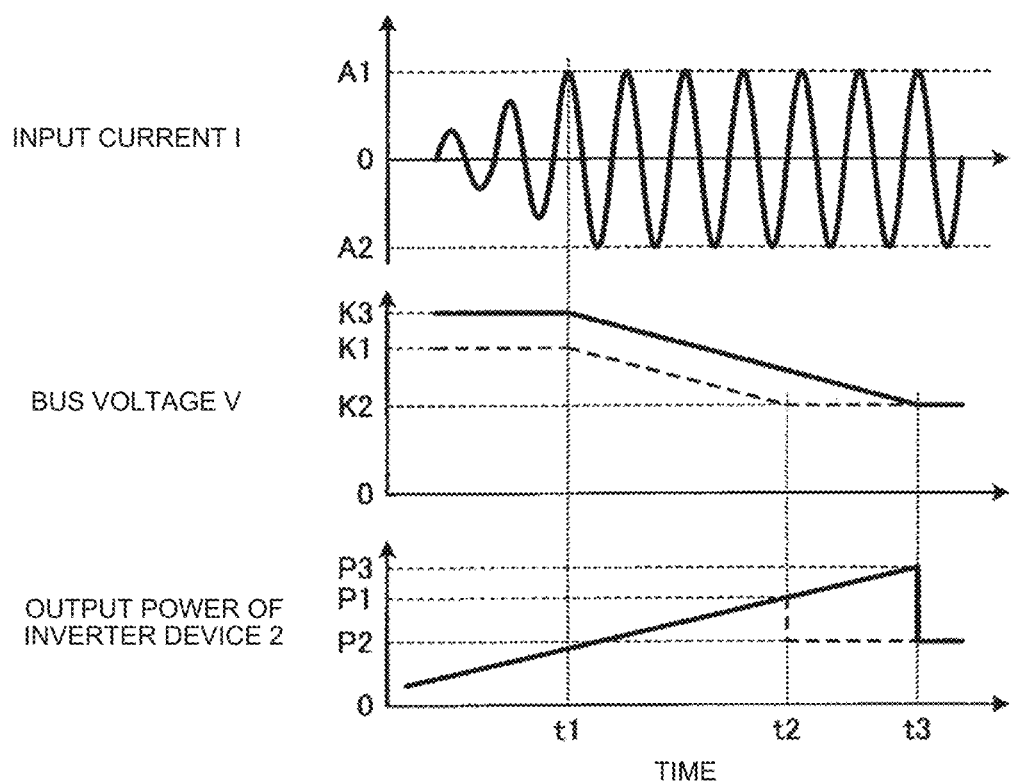
FIG. 8 is a diagram for describing the operation of a motor drive device according to a second embodiment.

An example of control to be performed in the case where a bus voltage control function is added to the converter device 1 will be described in a second embodiment. FIG. 8 is a diagram for describing the operation of a motor drive device according to the second embodiment. Note that the basic configuration of the motor drive device according to the second embodiment is the same as that in the first embodiment.

In the configuration of FIG. 1, the converter control operation unit 10b according to the second embodiment has the function of controlling the bus voltage V. At this time, the converter control operation unit 10b operates as a voltage control unit that controls the bus voltage V. Note that when the bus voltage V is controlled to be a determined value in the converter device 1, information on the bus voltage V is necessary. In this case, the control unit 10 of the converter device 1 includes a bus voltage detection unit for detecting the bus voltage V.

A time-varying waveform of the input current I is illustrated in the upper part of FIG. 8. Two time-varying waveforms of the bus voltage V are illustrated in the middle part of FIG. 8. Of the two waveforms, a waveform indicated by a thick broken line is the same as that illustrated in FIG. 2, and a waveform indicated by a thick solid line is a waveform to be shown in the case of setting the bus voltage V to a value K3, which is higher than the normal value K1, by using the bus voltage control function of the converter device 1. Note that the normal value K1 generally refers to a minimum voltage command value required by the control unit 10 of the converter device 1 in performing current control. Therefore, the value K3 is higher than a minimum voltage value required by the control unit 10 of the converter device 1 in performing current control. Note that the normal value K1 may be, for example, a nominal value.

Furthermore, two time-varying waveforms of the output power of the inverter device 2 are illustrated in the lower part of FIG. 8. Of the two waveforms illustrated from time t2 to time t3, a waveform indicated by a thick broken line is the same as that illustrated in FIG. 2, and a waveform indicated by a thick solid line corresponds to a waveform to be shown in the case of setting the bus voltage V to the value K3.

In FIG. 8, a limitation is imposed on the input current I at time t1 and accordingly, the bus voltage V decreases, as described with reference to FIG. 2. In the example of FIG. 2, control is performed such that a limitation is imposed on the output power at the time t2, at which the output power of the inverter device 2 reaches P1, as indicated by the thick broken line in FIG. 8. In contrast, when the bus voltage V is set to K3, it takes longer for the bus voltage V to decrease to K2 as a lower limit. Thus, it is possible to defer the start time of limiting the output power of the inverter device 2. FIG. 8 illustrates an example in which, at the time t3, the output power of the inverter device 2 reaches P3 and is reduced to P2 due to the limitation on the output power.

According to the control of the second embodiment, control can be achieved such that the converter device 1 increases the bus voltage by using the detection value of the bus voltage V. That is, the voltage command value for controlling the bus voltage V in the converter control operation unit 10b can be set to K3 higher than K1. Therefore, it is possible to secure a voltage range of the bus voltage V from K3 to K2 as the lower limit. As a result, it is possible to achieve an effect of enabling the time at which the inverter device 2 starts to limit output power to be deferred. Note that generally, energy stored in a smoothing capacitor is proportional to the square of voltage. For this reason, an increase in bus voltage can achieve an effect which is not simply proportional to the increase in the bus voltage, but proportional to the square of the increase in the bus voltage.

Third Embodiment

The first and second embodiments are embodiments in which the motor drive device 50 drives the single motor 6. An embodiment in which the motor drive device 50 drives a plurality of the motors 6 will be described in a third embodiment.

Figure 9:
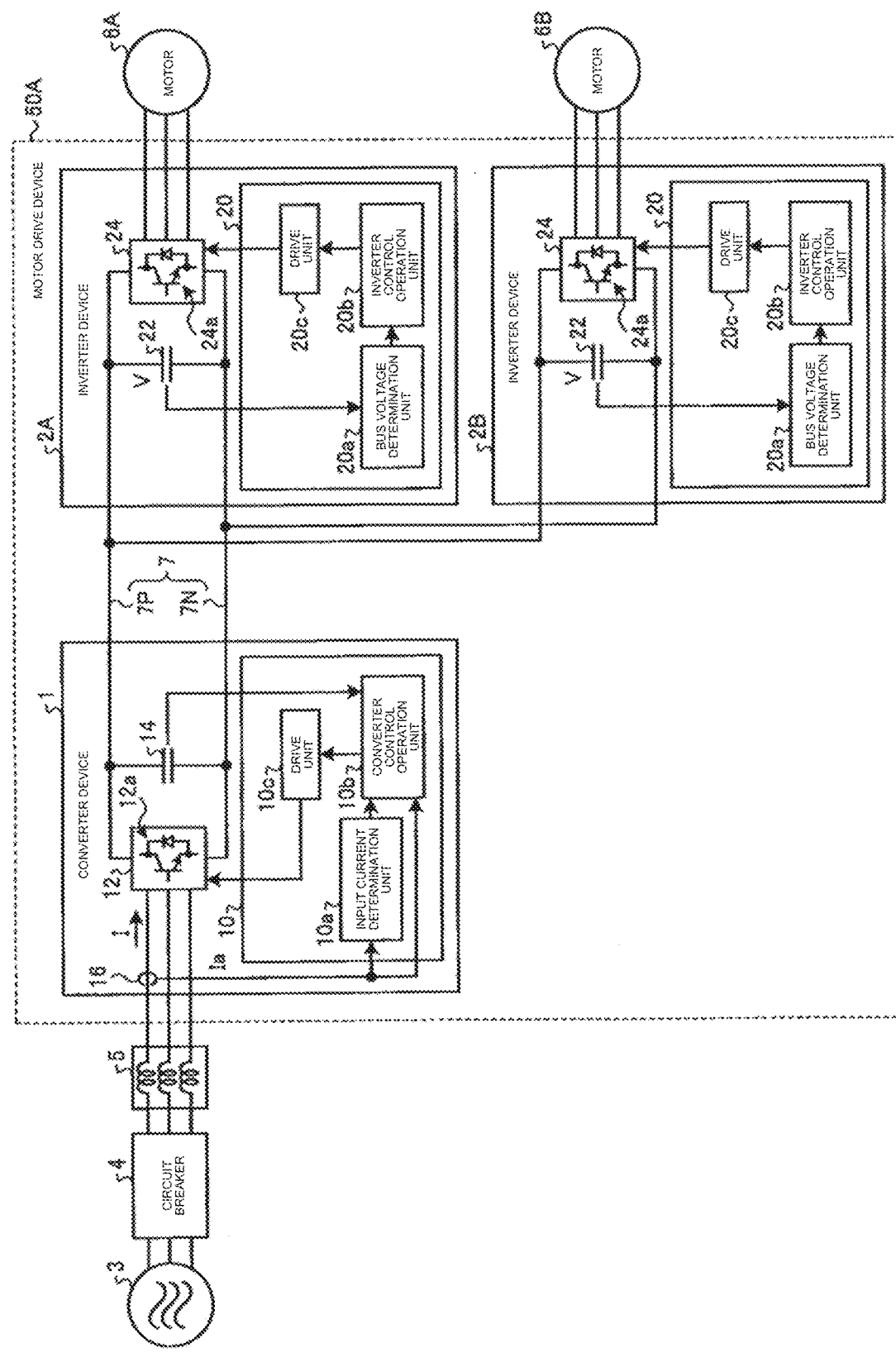
FIG. 9 is a configuration diagram of a motor drive system including a motor drive device according to a third embodiment.

FIG. 9 is a configuration diagram of a motor drive system 100A including a motor drive device 50A according to the third embodiment. FIG. 9 illustrates the motor drive device 50A that includes an inverter device 2A and an inverter device 2B. The inverter device 2A drives a motor 6A. The inverter device 2B drives a motor 6B. The inverter devices 2A and 2B are examples of a plurality of inverter devices. The inverter devices 2A and 2B are connected to the common DC bus 7 in parallel with each other. The respective configurations of the inverter devices 2A and 2B are identical. The motors 6A and 6B are examples of a plurality of motors. Note that constituent elements that are the same as or equivalent to those in the configuration of FIG. 1 are given the same reference signs and the same names, and redundant descriptions are omitted.

Figure 10:
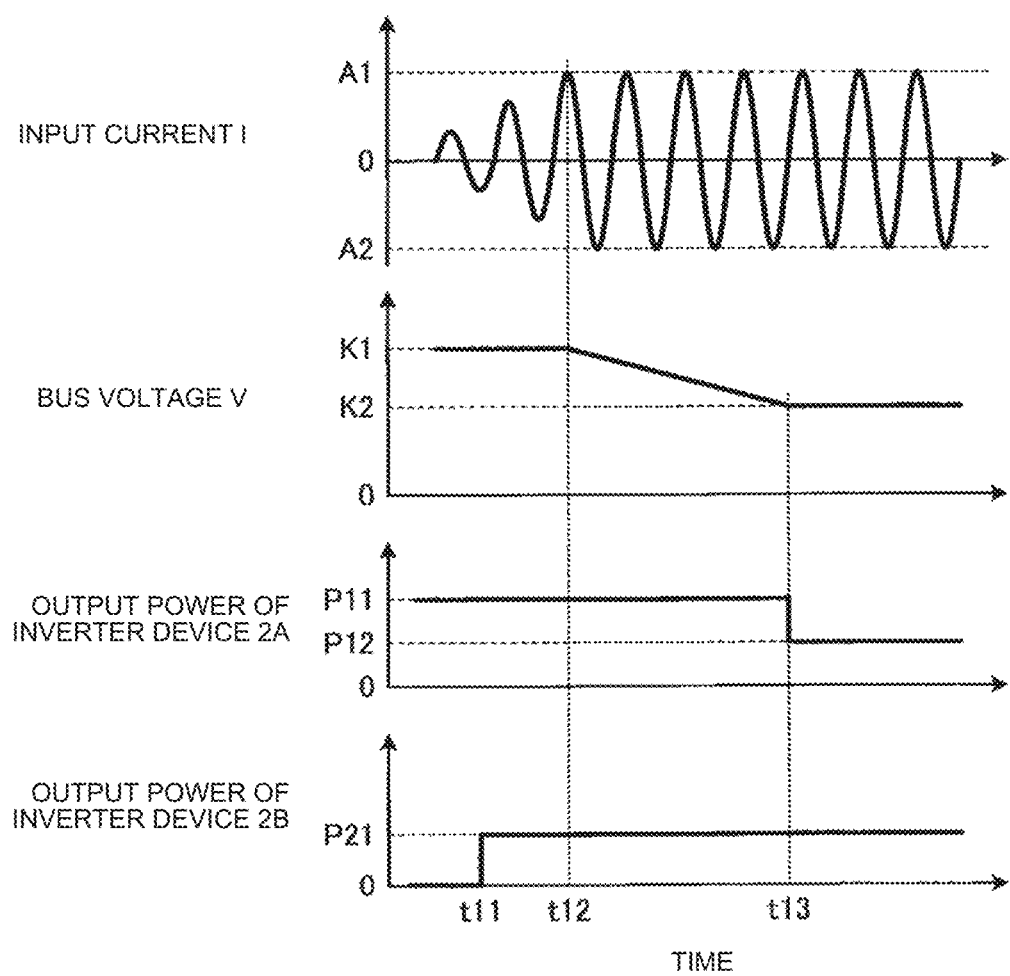
FIG. 10 is a diagram for describing the operation of the motor drive device according to the third embodiment.

Next, the operation of the motor drive device 50A according to the third embodiment will be described with reference to FIGS. 9 and 10. FIG. 10 is a diagram for describing the operation of the motor drive device 50A according to the third embodiment.

A time-varying waveform of the input current I is illustrated in the upper part of FIG. 10. The waveform illustrated in the upper part of FIG. 10 is equivalent to the waveform illustrated in the upper part of FIG. 2. A time-varying waveform of the bus voltage V is illustrated in the upper middle part of FIG. 10. The waveform illustrated in the upper middle part of FIG. 10 is equivalent to the waveform illustrated in the middle part of FIG. 2. A time-varying waveform of the output power of the inverter device 2A is illustrated in the lower middle part of FIG. 10. A time-varying waveform of the output power of the inverter device 2B is illustrated in the lower part of FIG. 10.

FIG. 10 illustrates a situation where only the inverter device 2A operates until time t11, and both the inverter device 2A and the inverter device 2B operate from the time t11. After the time t11, output power P21 of the inverter device 2B is added to output power P11 of the inverter device 2A. Therefore, after the time t11, the output power of the inverter devices as a whole increases, and the input current I increases. Then, a limitation is imposed on the input current I at time t12, and the bus voltage V decreases from K1, which is a value corresponding to the time t12. As both the inverter devices 2A and 2B continue to operate, the bus voltage V continues to decrease as illustrated. Then, at time t13, at which the value of the bus voltage V decreases to K2, a limitation is imposed on the output power of the inverter device 2A. As described above, the output power of the inverter device 2A is limited by the control of the torque command or the rotation speed command in a lowering direction. FIG. 10 illustrates an example in which the output power of the inverter device 2A is reduced from P11 to P12 at the time t13. With this control, the decrease in the bus voltage V is stopped. Therefore, the decrease in the bus voltage V does not cause the system to stop. Thus, the operation of the system is continued.

Note that, a case where a limitation is imposed on the output power of the inverter device 2A is illustrated in the example of FIG. 10. However, the present invention is not limited to this example. A limitation may be imposed on the output power of the inverter device 2B. Alternatively, a limitation may be imposed on the output power of both the inverter devices 2A and 2B.

Furthermore, an output power limiting function may be provided only to a specific inverter device. The following case can be cited as an example. An output power limiting function is provided only to an inverter device having a small effect on tact time in a production process. Thus, output power is limited in the inverter device provided with the limiting function. According to this example, it is possible to reduce the peak value of input current and input power while maintaining productivity.

In order to provide the output power limiting function to one of the plurality of inverter devices, the function may be stored in advance in the memory 202 of the corresponding inverter device, or may be externally input by a user to the inverter control operation unit 20b of the corresponding inverter device.

Furthermore, it is possible to cite another example in which when the detection value Vd of the bus voltage V decreases to a predetermined set value, some of the inverter devices are controlled to be in a regenerative state. Note that the set value may be the lower limit K2. Alternatively, a value larger than the lower limit K2 may be selected as the set value. According to this example, compared to a case where some of the inverter devices are not controlled to be in a regenerative state, it is possible to achieve an effect of reducing time for the limiting action of the motor drive device 50A in addition to an effect of deferring the start time of limiting output power.

Fourth Embodiment

The first to third embodiments assume the cases of power running. Meanwhile, an embodiment assuming the case of regeneration will be described in a fourth embodiment. An object of the present embodiment is to reduce the peak value of regenerative energy, so that energy flows in a direction opposite to that in the case of power running. Except for this point, the present embodiment is the same as the first to third embodiments.

In the fourth embodiment, the sign of the power factor of input current and input voltage on the AC side of the converter device 1 is negative. That is, in the fourth embodiment, there is a phase relationship such that energy is regenerated.

Figure 11:
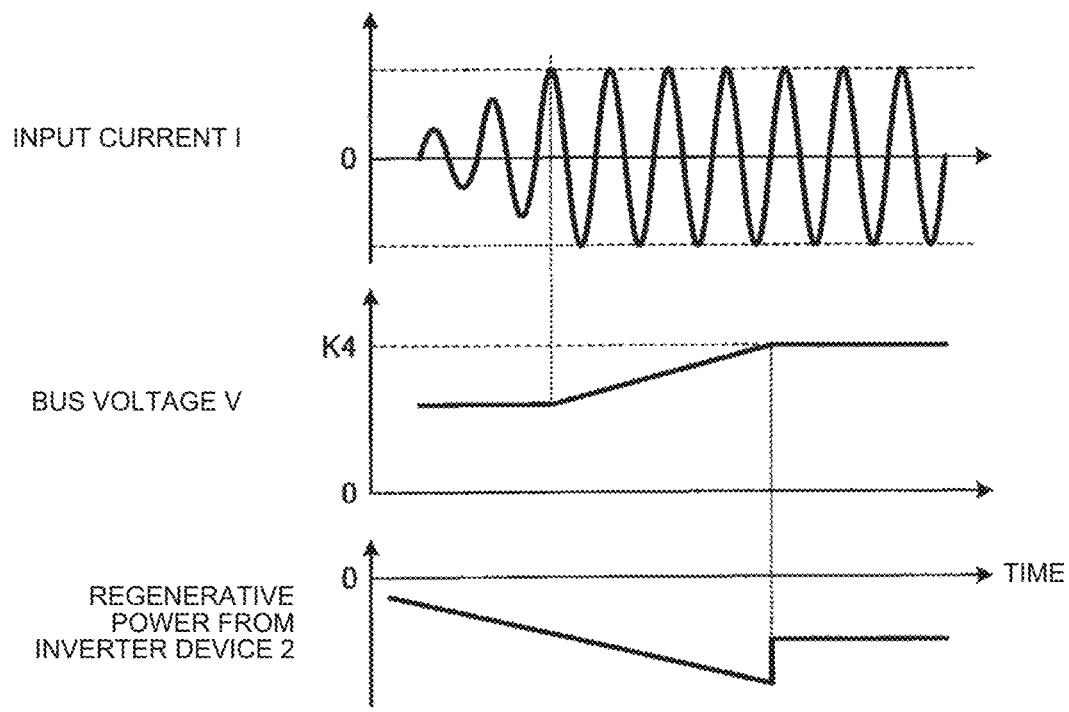
FIG. 11 is a diagram for describing the operation of a motor drive device according to a fourth embodiment.

FIG. 11 is a diagram for describing the operation of a motor drive device according to the fourth embodiment. In the fourth embodiment, when the amplitude of input current I is limited, the bus voltage V increases. This is because the input current I or input power to be regenerated on the AC side of the converter device 1 is limited without limiting regenerative energy from the motor 6. Therefore, in the fourth embodiment, an upper limit K4 of the bus voltage V is set, and when the bus voltage V reaches the upper limit K4, energy to be regenerated and provided from the motor 6 to the converter device 1 via the inverter device 2 is limited so as to stop an increase in the bus voltage V.

In the case where the bus voltage determination unit 20a determines that the bus voltage V has reached the upper limit K4, when receiving the determination result, the inverter control operation unit 20b adjusts regenerative output power from the inverter circuit 24 so as to control regenerative energy from the motor 6.

According to the fourth embodiment, it is possible to reduce the peak of the input current I or input power on the AC side of the converter device 1 at the time of regeneration also in the case of performing regenerative control, in addition to the case of performing power running control as in the first to third embodiments. As a result, an effect of reducing the capacity of a peripheral device can be obtained. That is, even if the capacity of the peripheral device is small, it is possible to perform regenerative control in addition to power running control.

Fifth Embodiment

In the first to third embodiments, when the bus voltage determination unit 20a determines that the bus voltage V has decreased to the lower limit K2, that is, the converter device 1 is in an overload state, the inverter control operation units 20b of the inverter devices 2A and 2B limit voltages to be output to the motors 6 to 6B. In a fifth embodiment, the inverter devices 2A and 2B notify a higher-level control device 500 of results of determination of the bus voltage determination units 20a via communication paths 38a and 38b, so that the higher-level control device 500 recognizes the overload state of the converter device 1. In the case where the converter device 1 is in an overload state, the higher-level control device 500 generates and outputs a motor operation command to at least one of the inverter devices 2A and 2B via corresponding one of the communication paths 38a and 38b so as to limit the output of corresponding one of the motors 6A and 6B. Then, at least the one of the inverter devices 2A and 2B controls output power on the basis of the motor operation command so as to reduce the output of the corresponding one of the motors 6A and 6B. Hereinafter, the fifth embodiment will be described in detail.

Figure 12:
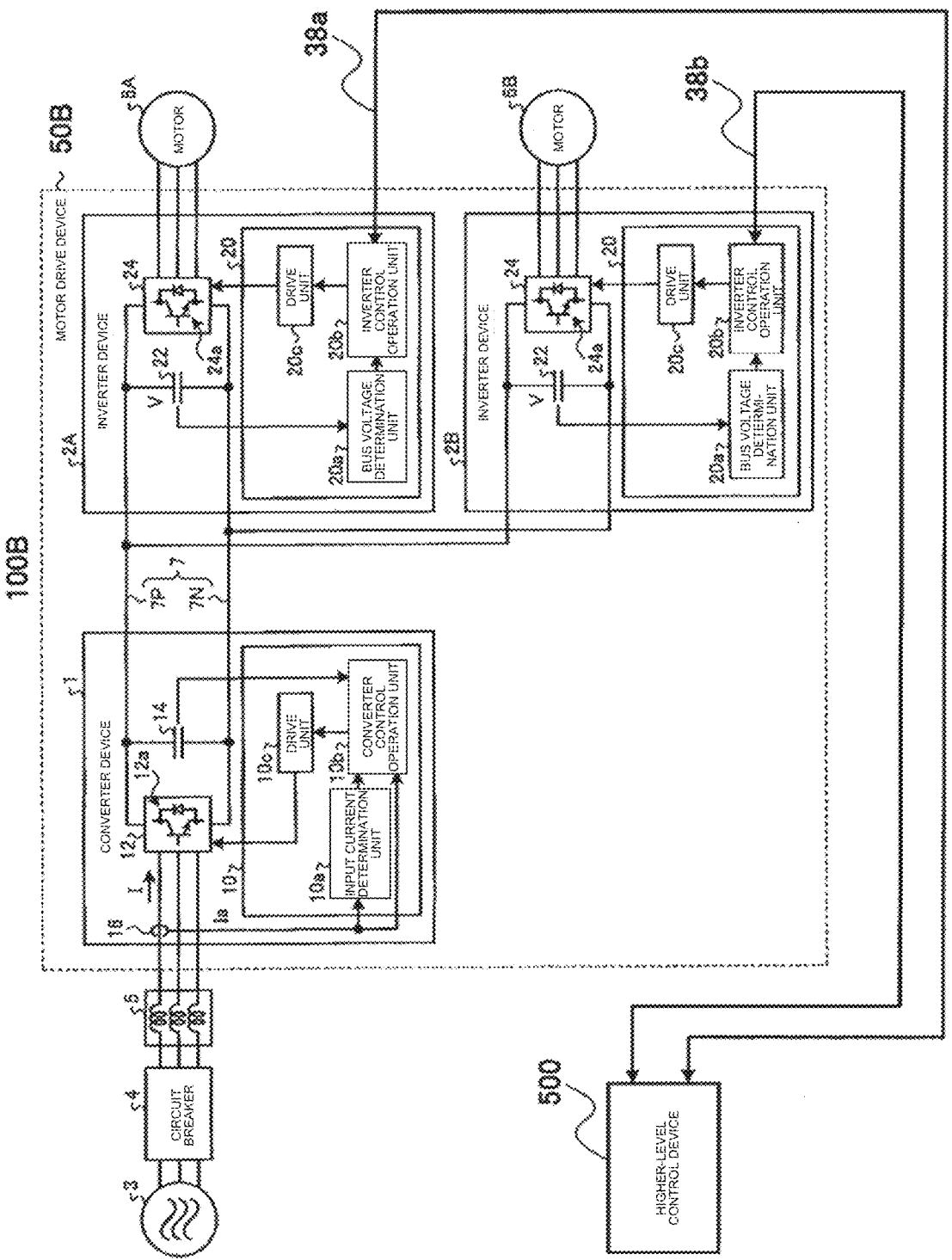
FIG. 12 is a configuration diagram illustrating a motor drive system according to a fifth embodiment.

FIG. 12 is a configuration diagram illustrating a motor drive system 100B according to the fifth embodiment. Note that in FIG. 12, constituent elements that are the same as or equivalent to the constituent elements according to the third embodiment illustrated in FIG. 9 are denoted by the same reference signs, and redundant descriptions are omitted below so as to eliminate overlap with the third embodiment.

The motor drive system 100B has a configuration similar to that of the motor drive system 100A according to the third embodiment illustrated in FIG. 9. However, the motor drive system 100B includes a motor drive device 50B and the higher-level control device 500 such as an NC control device. The inverter device 2A and the inverter device 2B included in the motor drive device 50B are connected to the higher-level control device 500 via the communication paths 38a and 38b, respectively. The higher-level control device 500 transmits motor operation commands to the inverter devices 2A and 2B via the communication paths 38a and 38b, respectively. The inverter devices 2A and 2B transmit information on their own states (for example, current flowing through the motors, motor rotation numbers, and bus voltage) to the higher-level control device 500 via the communication paths 38a and 38b, respectively. As described above, the inverter devices 2A and 2B and the higher-level control device 500 can transmit and receive signals to and from each other via the communication paths 38a and 38b.

Note that for example, a spindle motor is employed as the motor 6A, and for example, a servomotor is employed as the motor 6B in the fifth embodiment. The spindle motor is often used as a main shaft of a machine tool. The servomotor is often used as a feed shaft of a machine tool, and requires less time for acceleration/deceleration (hereinafter, acceleration/ deceleration time) than a spindle motor. However, other motors may be employed as the motors 6A and 6B.

Figure 13:
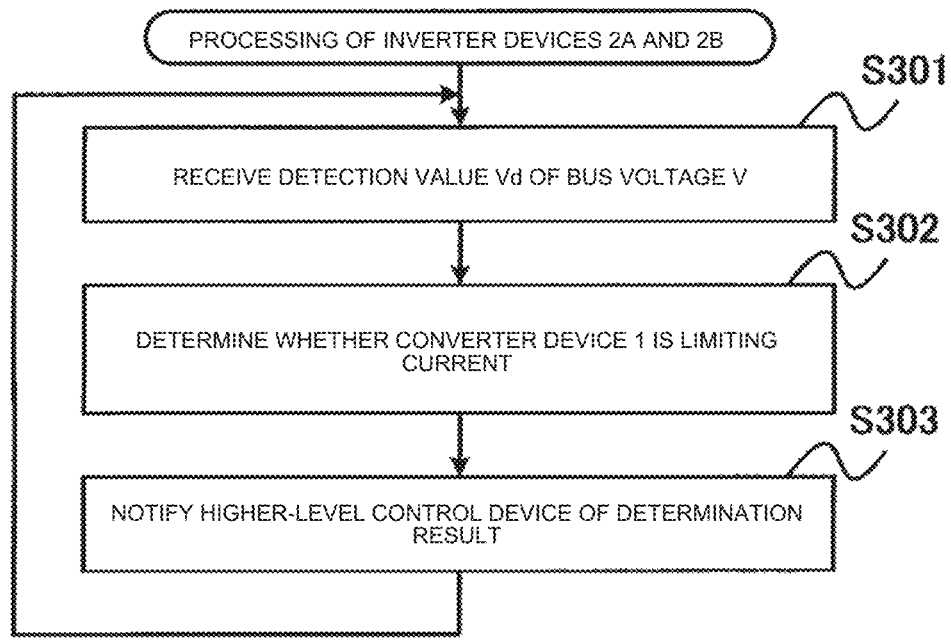
FIG. 13 is a flowchart illustrating an operation flow in inverter devices according to the fifth embodiment.
Figure 14:
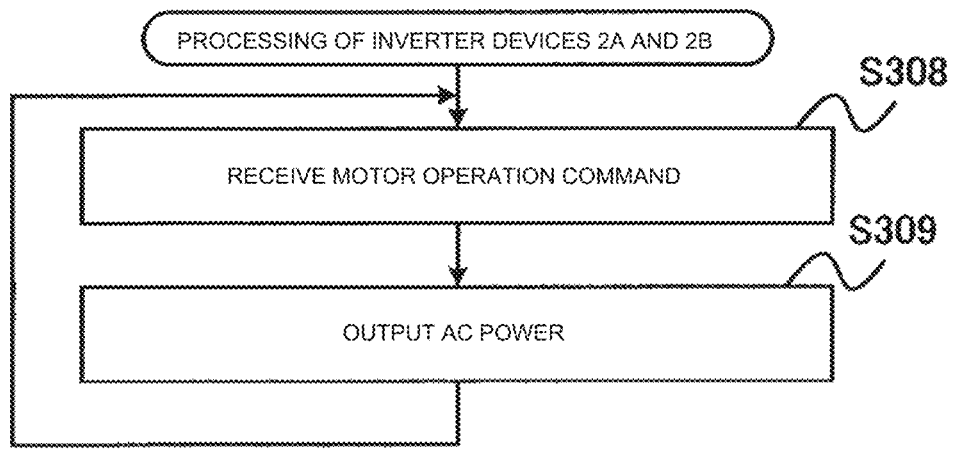
FIG. 14 is a flowchart illustrating an operation flow in the inverter devices according to the fifth embodiment.

Next, the operation of the motor drive system 100B according to the fifth embodiment will be described with reference to FIGS. 13 to 15. Of these drawings, FIGS. 13 and 14 are flowcharts illustrating operation flows of the inverter devices 2A and 2B included in the motor drive system 100B according to the fifth embodiment. In addition, FIG. 15 is a flowchart illustrating an operation flow of the higher-level control device 500 included in the motor drive system 100B according to the fifth embodiment.

As illustrated in FIG. 13, the bus voltage determination unit 20a of each of the inverter devices 2A and 2B receives the detection value Vd of bus voltage (step S301). Note that the bus voltage may be detected by the bus voltage determination unit 20a. The bus voltage determination unit 20a compares the detection value Vd with the threshold value Vs, and determines whether the converter device 1 is in an overload state (that is, whether the converter device 1 is limiting current) (step S302). The threshold value Vs corresponds to the lower limit K2 of the bus voltage V illustrated in FIG. 2. If the detection value Vd is lower than the threshold value Vs, the bus voltage determination unit 20a determines that the converter device 1 is in an overload state and is operating to limit the input current I, that is, the converter device 1 is limiting current. Meanwhile, if the detection value Vd is equal to or larger than the threshold value Vs, the bus voltage determination unit 20a determines that the converter device 1 is not in an overload state and is not operating to limit the input current I, that is, the converter device 1 is not limiting current. Then, the inverter devices 2A and 2B notify the higher-level control device 500 of results of the determination made in step S302 via the corresponding communication paths 38a and 38b (step S303). When the processing of step S303 ends, the inverter devices 2A and 2B return to the processing of step S301, and repeat the processing of steps S301 to S303. In the processing of steps S301 to S303, the bus voltage determination unit 20a of each of the inverter devices 2A and 2B determines whether the converter device 1 is in an overload state (that is, whether the converter device 1 is limiting current), and notifies the higher-level control device 500 of a result of determination.

Figure 15:
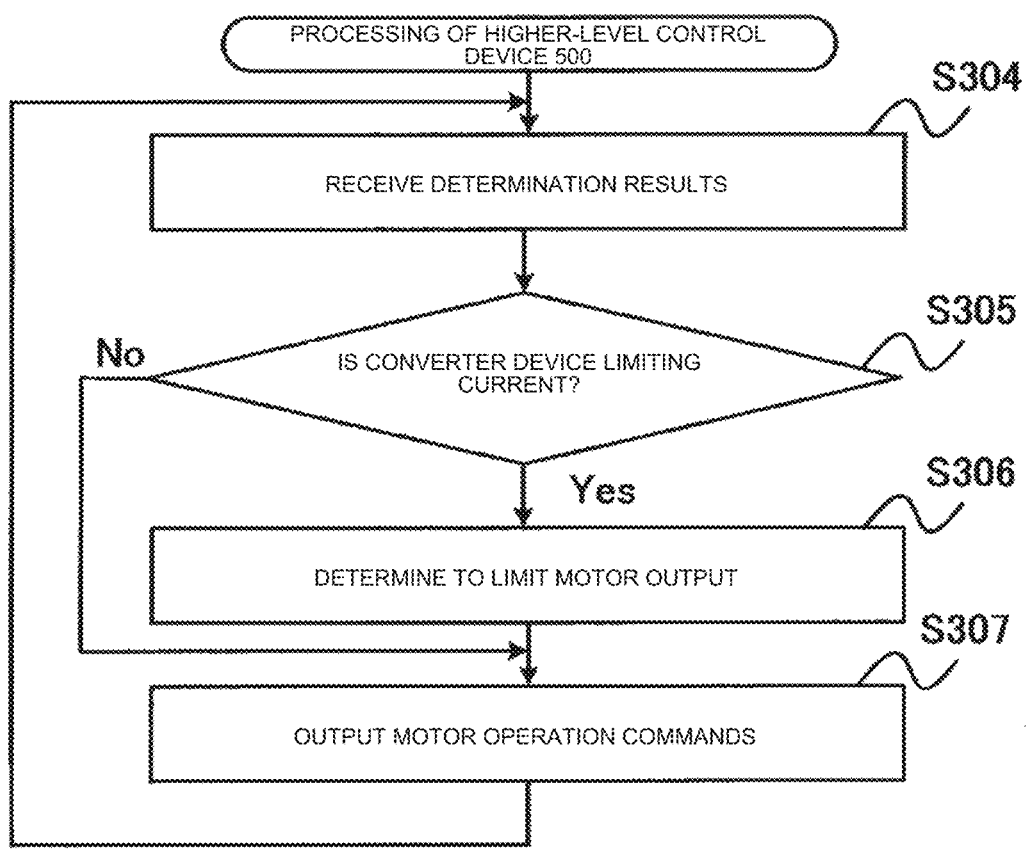
FIG. 15 is a flowchart illustrating an operation flow in a higher-level control device according to the fifth embodiment.

As illustrated in FIG. 15, the higher-level control device 500 receives the results of determination of the inverter devices 2A and 2B via the communication paths 38a and 38b (step S304). When at least one of the determination results transmitted from the inverter devices 2A and 2B indicates that the converter device 1 is limiting current (step S305, Yes), the higher-level control device 500 determines to limit output of both the motors 6A and 6B (step S306), and outputs, to the inverter devices 2A and 2B that drive the motors to be controlled, motor operation commands for limiting motor output so as to reduce the total output of the motors 6A and 6B (step S307). Note that when the determination results transmitted from the inverter devices 2A and 2B indicate that the converter device 1 is not limiting current (step S305, No), the higher-level control device 500 proceeds to the processing of step S307 without performing the processing of step S306. That is, when both the determination results transmitted from the inverter devices 2A and 2B indicate that the converter device 1 is not limiting current, the higher-level control device 500 outputs normal motor operation commands without limiting output of the motors 6A and 6B (step S307). Steps S304 to S307 above correspond to the processing of the higher-level control device 500. The higher-level control device 500 repeatedly performs the processing of steps S304 to S307.

Furthermore, as illustrated in FIG. 14, the inverter devices 2A and 2B receive the motor operation commands from the higher-level control device 500 (step S308), and operate such that AC power corresponding to the received motor operation commands is output to the motors 6A and 6B. (step S309). Steps S308 and S309 above correspond to processing to be performed by the inverter devices 2A and 2B on the basis of the motor operation commands received from the higher-level control device 500. The inverter devices 2A and 2B repeatedly perform the processing of steps S308 and S309.

According to the fifth embodiment, when the converter device 1 limits the input current I, the higher-level control device 500 outputs, to the corresponding inverter devices, motor operation commands for limiting the output of both the motors 6A and 6B, so that the inverter devices 2A and 2B control output power in such a way as to reduce the total output of the motors 6A and 6B to be controlled. Accordingly, it is possible to eliminate current limiting operation of the converter device 1. It is thus possible to eliminate adverse effects such as deterioration of the life of the converter device 1 or damage thereof without stopping the system.

Sixth Embodiment

In the fifth embodiment, the inverter devices 2A and 2B are connected to the higher-level control device 500 via the communication paths 38a and 38b, respectively. In a sixth embodiment, the inverter devices 2A and 2B are connected in series, that is, in a so-called daisy chain manner, to the higher-level control device 500 via communication paths 39a1, 39a2, 39b1, and 39b2. Details will be described below.

Figure 16:
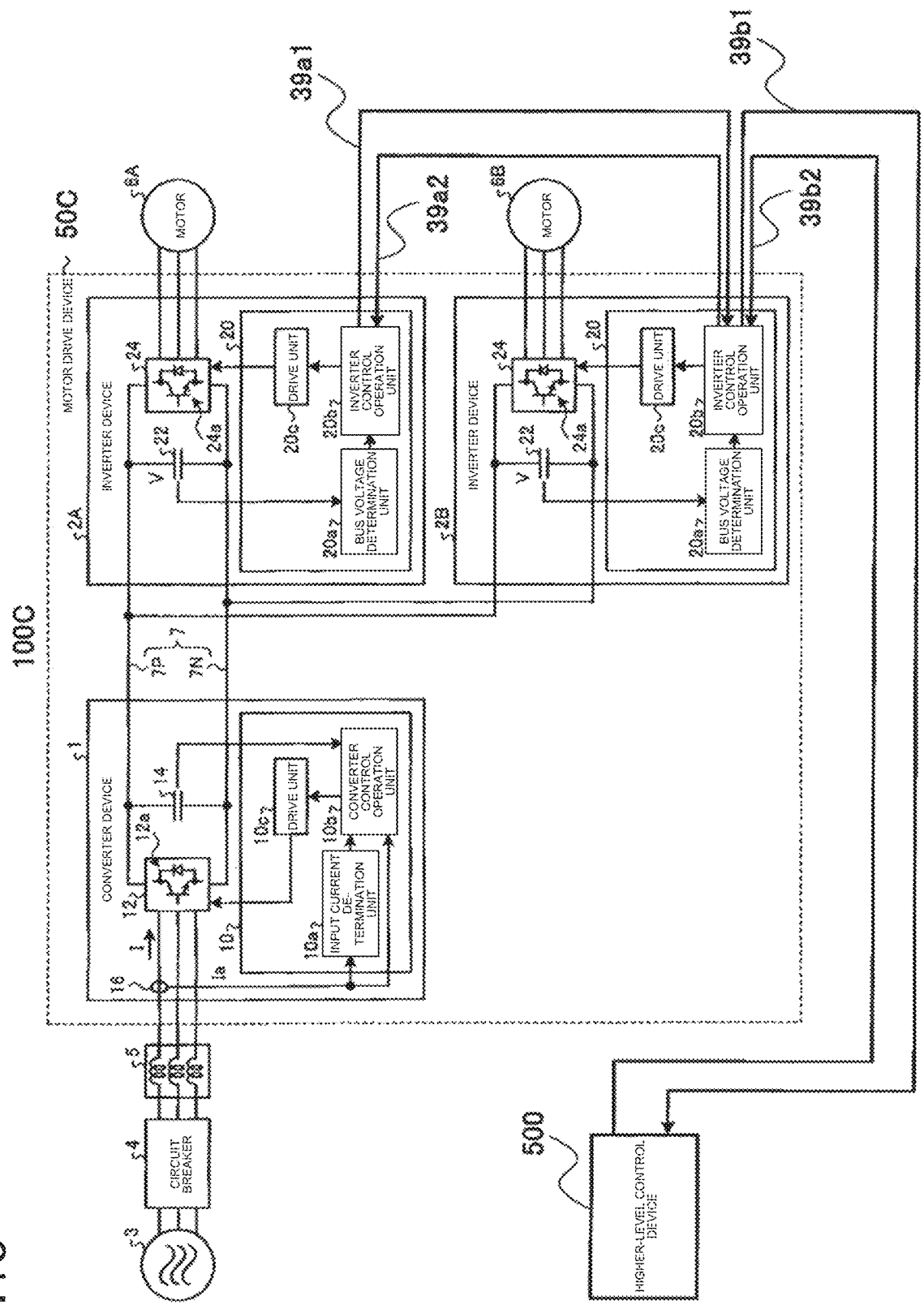
FIG. 16 is a configuration diagram illustrating a motor drive system according to a sixth embodiment.

FIG. 16 is a configuration diagram illustrating a motor drive system 100C according to the sixth embodiment. Note that in FIG. 16, constituent elements that are the same as or equivalent to the constituent elements according to the fifth embodiment illustrated in FIG. 12 are denoted by the same reference signs, and redundant descriptions are omitted below so as to eliminate overlap with the fifth embodiment.

The motor drive system 100C has a configuration similar to that of the motor drive system 100B according to the fifth embodiment illustrated in FIG. 12. However, the motor drive system 100C has the following configuration. The higher-level control device 500 and the inverter control operation unit 20b of the inverter device 2B are connected by the communication paths 39b1 and 39b2. The inverter control operation unit 20b of the inverter device 2B and the inverter control operation unit 20b of the inverter device 2A are connected by the communication paths 39a1 and 39a2. The higher-level control device 500 and the inverter control operation unit 20b of the inverter device 2A are not directly connected but are connected indirectly. (so-called daisy chain connection). For example, in the motor drive system 100C configured as described above, a motor operation command output from the higher-level control device 500 to the inverter device 2A is input to the inverter control operation unit 20b of the inverter device 2A via the inverter control operation unit 20b of the inverter device 2B. Similarly, a result of determination as to whether the converter device 1 is limiting current, output from the inverter device 2A to the higher-level control device 500, is input to the higher-level control device 500 via the inverter control operation unit 20b of the inverter device 2B.

Figure 17:
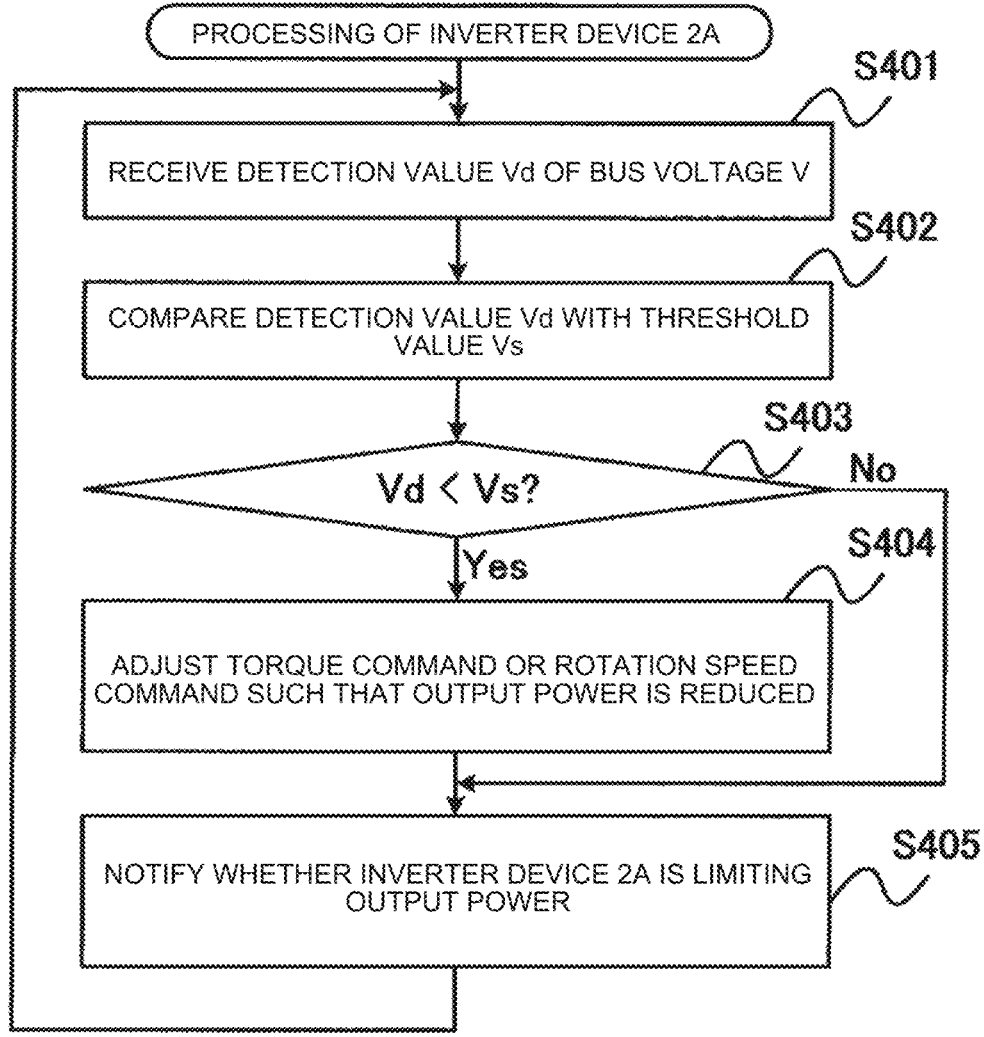
FIG. 17 is a flowchart illustrating an operation flow in an inverter device according to the sixth embodiment.
Figure 18:
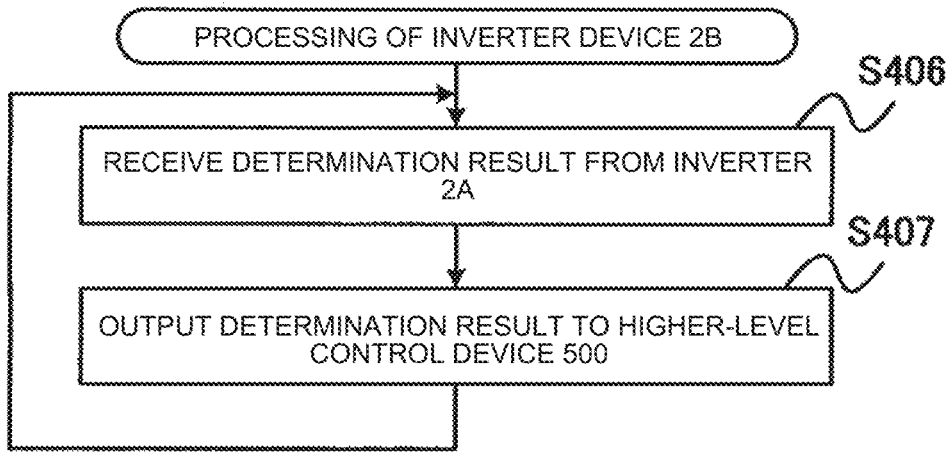
FIG. 18 is a flowchart illustrating an operation flow in an inverter device according to the sixth embodiment.

Next, the operation of the motor drive system 100C according to the sixth embodiment will be described with reference to FIGS. 17 to 19. Of these drawings, FIG. 17 is a flowchart illustrating an operation flow of the inverter device 2A included in the motor drive system 100C according to the sixth embodiment. FIG. 18 is a flowchart illustrating an operation flow of the inverter device 2B included in the motor drive system 100C according to the sixth embodiment. In addition, FIG. 19 is a flowchart illustrating an operation flow of the higher-level control device 500 included in the motor drive system 100C according to the sixth embodiment.

The bus voltage determination unit 20a of the inverter device 2A receives the detection value Vd of bus voltage as illustrated in FIGS. 16 and 17 (step S401). Note that the bus voltage may be detected by the bus voltage determination unit 20a. The bus voltage determination unit 20a compares the detection value Vd with the threshold value Vs, and determines whether the converter device 1 is in an overload state (that is, whether the converter device 1 is limiting current) (step S402), and transmits, as an output signal, a result of determination as to whether the detection value Vd is lower than the threshold value Vs to the inverter control operation unit 20b. The threshold value Vs corresponds to the lower limit K2 of the bus voltage V illustrated in FIG. 2. When the detection value Vd is lower than the threshold value Vs (step S403, Yes), the bus voltage determination unit 20a outputs, to the inverter control operation unit 20b, a torque command or an output power limit signal for limiting the number of rotations. In response to the result of determination of the bus voltage determination unit 20a, the inverter control operation unit 20b performs the above-described process of limiting the output power of the inverter device 2A (step S404). Specifically, the inverter control operation unit 20b generates a PWM signal in such a way as to limit the output power. After the processing of step S404 ends, the bus voltage determination unit 20a performs the processing of step S405. Meanwhile, when the detection value Vd is equal to or larger than the threshold value Vs (step S403, No), the bus voltage determination unit 20a performs the processing of step S405 without performing the processing of step S404. Then, in step S405, the bus voltage determination unit 20a notifies the inverter device 2B via the communication path 39a1 whether the inverter device 2A is limiting the output power. Steps S401 to S405 above correspond to the processing of the inverter device 2A, and the inverter device 2A repeatedly performs the processing of steps S401 to S405.

As illustrated in FIGS. 16 and 18, the inverter device 2B receives the result of determination as to whether the inverter device 2A is limiting the output power, via the communication path 39a1 (step S406). Furthermore, the inverter device 2B notifies the higher-level control device 500 of the result of determination as to whether the inverter device 2A is limiting the output power, via the communication path 39b1 (step S407). Steps S406 and S407 above correspond to the processing of the inverter device 2B, and the inverter device 2B repeatedly performs the processing of steps S406 and S407.

Figure 19:
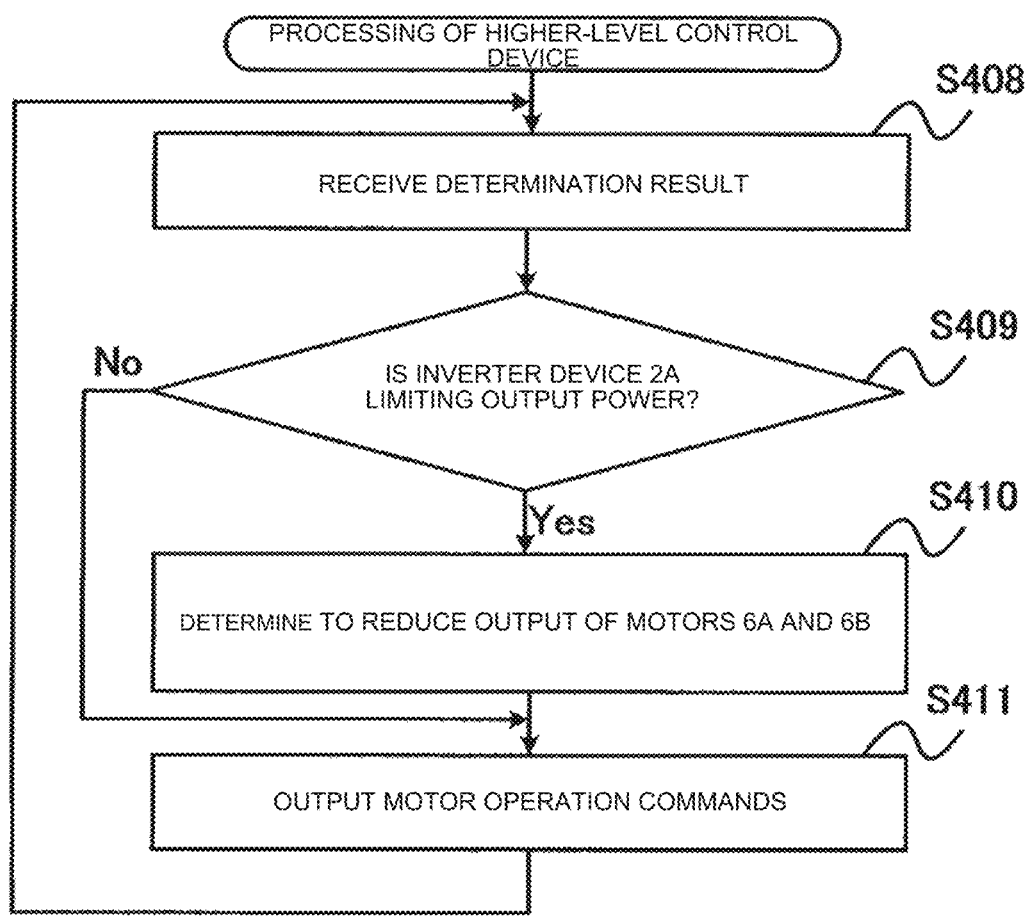
FIG. 19 is a flowchart illustrating an operation flow in a higher-level control device according to the sixth embodiment.

As illustrated in FIGS. 16 and 19, the higher-level control device 500 receives the result of determination as to whether the inverter device 2A is limiting the output power, via the communication path 39b1 (step S408). When the determination result indicates that the inverter device 2A is limiting the output power (step S409, Yes), the higher-level control device 500 determines to limit the output of both the motors 6A and 6B (step S410), and outputs, to the inverter devices 2A and 2B that drive the motors to be controlled, motor operation commands for limiting motor output so as to reduce the total output of the motors 6A and 6B, via the communication path 39b2 (step S411). Meanwhile, when the determination result indicates that the inverter device 2A is not limiting the output power (step S409, No), the higher-level control device 500 proceeds to the processing of step S411 without performing the processing of step S410. That is, when the determination result indicates that the inverter device 2A is not limiting the output power, the higher-level control device 500 determines that the converter device 1 is not limiting the input current I. Thus, the higher-level control device 500 outputs normal motor operation commands to the inverter devices 2A and 2B via the communication path 39b1 without limiting output of the motors 6A and 6B (step S411). Steps S408 to S411 above correspond to the processing of the higher-level control device 500, and the higher-level control device 500 repeatedly performs the processing of steps S408 to S411.

According to the sixth embodiment, the inverter devices 2A and 2B are connected in series, that is, in a so-called daisy chain manner, to the higher-level control device 500 via the communication paths 39a1, 39a2, 39b1, and 39b2. As a result, it is possible to achieve operation and effect similar to the operation and effect of the fifth embodiment, and also to simplify wiring, so that the number of wires and the number of steps related to management can be reduced.

Note that in the fifth and sixth embodiments, both the inverter devices 2A and 2B notify the higher-level control device 500 of results of determination of the bus voltage determination units 20a via the communication paths 38a and 38b, respectively. However, the present invention is not limited to this configuration. Only one of the inverter devices 2A and 2B may notify the higher-level control device 500 of the result of determination of the bus voltage determination unit 20a via corresponding one of the communication paths 38a and 38b.

Furthermore, in the fifth or sixth embodiment, when the determination result indicates that the converter device 1 is limiting current, the higher-level control device 500 determines to limit the output of both the motors 6A and 6B, and outputs motor operation commands for limiting total motor output, to the inverter devices 2A and 2B that drive the motors to be controlled. However, the present invention is not limited thereto. In an industrial machine, such as a machine tool, that uses a plurality of motors, it is desirable to output a motor operation command and eliminate the current limiting operation of the converter device 1 while maintaining cycle time such that it does not increase. Therefore, when the determination result indicates that the converter device 1 is limiting current, it is desirable for the higher-level control device 500 to output a motor operation command that does not limit the motor output of the motor 6A as a spindle motor, and to output a motor operation command that limits the motor output of the motor 6B as a servomotor. This limits the motor output of the motor 6B as a servomotor requiring less acceleration/deceleration time without changing the motor output of the motor 6A as a spindle motor requiring more acceleration/deceleration time. Thus, it is possible to eliminate the current limiting operation of the converter device 1 without affecting cycle time. Furthermore, a converter device having a small capacity can be selected. This can contribute to a cost reduction of the machine tool.

Moreover, in the fifth or sixth embodiment, the inverter devices 2A and 2B notify the higher-level control device of determination results as to whether the detection value Vd of bus voltage is lower than the threshold value Vs, via the corresponding communication paths. However, the present invention is not limited to this configuration. It is also possible to adopt the following configuration. The inverter devices 2A and 2B notify the detection value Vd of bus voltage to the higher-level control device via the corresponding communication paths, so that the higher-level control device determines whether the detection value Vd of bus voltage is lower than the threshold value Vs.

Note that the configuration illustrated in each of the above embodiments illustrates an example of the subject matter of the present invention, and it is possible to combine the configuration with another technique that is publicly known, and is also possible to omit or change part of the configuration without departing from the gist of the present invention.

REFERENCE SIGNS LIST 1 converter device; 2, 2A, 2B inverter device; 3 AC source; 4 circuit breaker; 5 reactor; 6, 6A, 6B motor; 7 DC bus; 7P high-potential-side conductor; 7N low-potential-side conductor; 10, 20 control unit; 10a input current determination unit; 10b converter control operation unit; 20b inverter control operation unit; 10c, 20c drive unit; 12 converter circuit; 12a, 24a switching element; 14, 22 smoothing capacitor; 16, 18 current detector; 20a bus voltage determination unit; 24 inverter circuit; 38a, 38b, 39a1, 39a2, 39b1, 39b2 communication path; 50, 50A, 50B, 50C motor drive device; 100, 100A, 100B, 100C motor drive system; 200 processor; 202 memory; 203 processing circuit; 204 interface.

The invention claimed is:

1. A motor drive device that receives AC power supplied from an AC source and drives a motor, the device comprising:
a converter circuit to convert the AC power into DC power;
an inverter circuit to drive the motor by converting the DC power supplied from the converter circuit into AC power and supplying the AC power to the motor;
a converter controller to perform control such that an input current flowing on an AC side of the converter circuit or input power supplied to the converter circuit does not exceed an upper limit; and
an inverter controller to detect a bus voltage that is a voltage of a DC bus connecting the converter circuit and the inverter circuit, and to limit output power of the inverter circuit such that the output power decreases, when a detection value of the bus voltage decreases to a set lower limit.

2. The motor drive device according to claim 1, wherein the converter controller performs pulse width modulation control on a switching element of the converter circuit such that the input current does not exceed the upper limit, and the inverter controller performs pulse width modulation control on a switching element of the inverter circuit such that the bus voltage does not fall below the lower limit.

3. The motor drive device according to claim 1, wherein the inverter controller continuously changes a limit value of power to be output to the motor.

4. The motor drive device according to claim 1, wherein the converter controller sets a voltage command value for controlling the bus voltage, to a value higher than a minimum voltage value necessary for current control.

5. The motor drive device according to claim 1, wherein in a case where regenerative control of energy of the motor is performed, the inverter controller limits regenerative output power of the inverter circuit such that an absolute value of the regenerative output power decreases, when the bus voltage reaches a set upper limit.

6. The motor drive device according to claim 1, comprising: a plurality of inverter devices each including the inverter circuit and the inverter controller, wherein the plurality of inverter devices are connected to the DC bus in parallel with each other.

7. The motor drive device according to claim 6, wherein the inverter controller limits the output power of the inverter circuit in a specific inverter device among the plurality of inverter devices.

8. The motor drive device according to claim 6, wherein when the bus voltage decreases to a predetermined set value, at least one of the plurality of inverter devices is controlled to be in a regenerative state.

9. The motor drive device according to claim 6, wherein the plurality of inverter devices are connected to a higher-level control device that generates and outputs a motor operation command, via a communication path, and drives respective motors connected to the plurality of inverter devices on a basis of the motor operation command output from the higher-level control device.

10. The motor drive device according to claim 9, wherein each of the plurality of inverter devices is connected to the higher-level control device.

11. The motor drive device according to claim 9, wherein the plurality of inverter devices are connected in series to the higher-level control device.

12. The motor drive device according to claim 9, wherein at least one of the plurality of inverter devices determines whether the detection value of the bus voltage decreases to the set lower limit, and notifies the higher-level control device of a determination result.

13. A motor drive system comprising: the motor drive device according to claim 12; and a higher-level control device to generate and output a motor operation command, wherein
when the determination result notified by at least the one of the plurality of inverter devices indicates that the detection value of the bus voltage decreases to the set lower limit, the higher-level control device outputs the motor operation command for reducing total motor output.

* * * * *